United States Patent
Menzel et al.

(10) Patent No.: US 6,622,027 B1
(45) Date of Patent: Sep. 16, 2003

(54) METHOD FOR ESTABLISHING A COMMUNICATION LINK

(75) Inventors: Christian Menzel, Maisach (DE); Axel Gabe, Augsburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/381,764
(22) PCT Filed: Feb. 12, 1998
(86) PCT No.: PCT/DE98/00401
§ 371 (c)(1), (2), (4) Date: Sep. 23, 1999
(87) PCT Pub. No.: WO98/43448
PCT Pub. Date: Oct. 1, 1998

(30) Foreign Application Priority Data

Mar. 25, 1997 (DE) .......................... 197 12 503

(51) Int. Cl.$^7$ ............................. H04B 1/38; H04M 1/00
(52) U.S. Cl. ....................................... 455/560; 455/552
(58) Field of Search ............................. 455/433, 434, 455/435, 436, 439, 456, 552, 560; 379/220, 230, 219, 207

(56) References Cited

U.S. PATENT DOCUMENTS

| | | | | |
|---|---|---|---|---|
| 5,805,078 A | * | 9/1998 | Sugiyama et al. | 340/825.52 |
| 5,946,385 A | * | 8/1999 | Sonnenberg | 379/220 |
| 6,021,327 A | * | 2/2000 | Nguyen et al. | 455/433 |
| 6,064,887 A | * | 5/2000 | Kallioniemi et al. | 455/445 |
| 6,122,510 A | * | 9/2000 | Granberg | 455/433 |

FOREIGN PATENT DOCUMENTS

| | | |
|---|---|---|
| DE | 195 09 000 A1 | 9/1996 |
| EP | 0 581 526 A2 | 2/1994 |
| EP | 581526 * | 2/1994 ............ H04Q/3/00 |
| EP | 0 738 093 A2 | 10/1996 |
| EP | 0 751 691 A2 | 1/1997 |
| GB | 2 299 913 A | 10/1996 |

OTHER PUBLICATIONS

Christensen, et al., "Basis Für Flexiblere Telecom–Dienste", vol. 4, No. 12, May (1991), pp. 54–59.

Beller, "Call Delivery to Portable Telephones Away From Home Using the Local Exchange Network", vol. 2, Jun. (1991), pp. 948–953.

* cited by examiner

*Primary Examiner*—Vivian Chin
*Assistant Examiner*—Tuan Tran
(74) *Attorney, Agent, or Firm*—Morrison & Foerster LLP (57) ABSTRACT

In a communications network, a first address information is transmitted from a first communication terminal equipment to a first switching node for setting up a communication connection, whereby first identification features are contained in the first address information. The first switching node interprets the first address information with the first identification features and derives a second address information for addressing a first address converter therefrom. At least parts of the first identification features are communicated to the first address converter. Second identification features are generated from the first identification features, said second identification features serving the purpose of addressing a second switching node. The communication connection between the first and second switching node is set up with the second identification features.

19 Claims, 7 Drawing Sheets

METHOD FOR ESTABLISHING A COMMUNICATION LINK

The invention is directed to a method for setting up a communication connection in a communication network composed of a plurality of network communication nodes and to an address converter for supporting the connection setup.

DESCRIPTION OF THE PRIOR ART

Communication networks are composed of a plurality of switching nodes networked with one another to which communication terminal equipment are connectible directly or via further devices. Examples of such communication networks are the public switched telephone network (PSTN), data networks or mobile radio telephone networks such as the GSM mobile radio telephone system (Global System For Mobile Communications).

A subscriber of one of these networks has a communication terminal equipment and would like to set up a communication connection to a second communication terminal equipment. To accomplish this, it is necessary to select an operator-specific telephone number in the communication terminal equipment. This operator-specific telephone number serves, for the switching node, as addressing (or symbolic identification) information for the second communication terminal equipment.

Given the likely increase in the plurality of communication networks operating in parallel in the future and the possible switch of a subscriber from one communication network of a network operator to a different communication network of a different network operator, the determination of operator-specific telephone numbers becomes increasingly complex.

EP-A-0 751 691 discloses an intelligent network (IN). Telephone numbers of an area (area code) of the one operator are dialed with TCAP messages and the STP. The operator forwards the call to the intelligent network. A data bank entry is read, and the number has an operator-specific telephone number added to it. The call is subsequently rerouted via a different operator.

Beller, M. J., "Call Delivery to Portable Telephones away from Home Using the Local Exchange Nethwerk" Communications—Rising to the Heights, Denver, Jun. 23–26, 1991, Vol. 2, pages 948–953, Institute of Electrical and Electronics Engineers, presents a service (800 method) of an intelligent network. Analogous to a 0130 service, a data bank is selected via a service control point (SCP) of an intelligent network. The intelligent network is dialed via a telephone number (service access code, 800). The SCP communicates with a switch via protocols transaction capability application part (TCAP).

Eske-Christensen, B., et al., "Basis für flexiblere Telecom-Dienste", Funkschau, Vol 63, No. 12, May 31, 1991, pages 54–59, discloses an intelligent network (IN). The service user selects the access to the intelligent network, a digital switching technology, with a telephone number (0130). I.e., the service user first selects a service switching point (SSP) with the dialing of the telephone number (0130) in order to use the service of the intelligent network. With this dialing-in, the SSP of the intelligent network communicates a TCAP message to the SCP of the intelligent network. The SCP drives a data bank, and the telephone number that is read out is communicated to the SSP with a TCAP message via the STP (signal transfer point). The SSP subsequently implements the numeral conversion and through-connects the route.

GB-A-2 299 913 likewise discloses an intelligent network. Here, the intelligent network is used in order to enable call re-directions, for example for overloaded long distance connections. A subscriber dials the number of a second subscriber. The call is redirected with TCAP and SCP.

SUMMARY OF THE INVENTION

The present invention is therefore based on the object of specifying a method and an address converter (or "symbol converter"—the "address" may be construed broadly as any symbolic representation of an identifier) that makes it easier for the calling subscriber to set up a communication connection to a further subscriber. This object is achieved according to the method for establishing a communication link and the address converter described below.

Given the inventive method, a first communication terminal equipment transmits a first address information to a first switching node for setting up a communication connection, whereby first identification features are contained in the first address information. The first switching node interprets the first address information with the first identification features and derives a second address information from it for addressing a first address converter. At least parts of the first identification features are communicated to the first address converter. Second identification features that serve the purpose of addressing a second switching node are generated from the first identification features. The communication connection between the first and second switching node is set up with the second identification features.

The inventive method enables the connection setup even given incomplete address information for operator-specific telephone numbers. Further, the chance of equality between operators of different communication networks is enhanced since subscriber-specific particulars suffice for the connection setup without exact network knowledge.

According to an advantageous development of the invention, the first address converter determines the address of an applicable second address converter from the first identification features, with this second address converter generating at least parts of the second identification features after corresponding signaling. In the sense of an intelligent network, a specialization of the address converters to specific functions can be facilitated, since not all first address converters need maintain a complete data set for the address conversion.

It is thus advantageous that a plurality of first address converters are arranged in the communication network according to geographical points of view. These first address converters are responsible for a specific area in one or more communication networks. These first address converters can be integrated as independent units in the sense of a SCP or in a switching node.

It is also advantageous that a plurality of second address converters are arranged in the communication network according to subscriber-classifying points of view. Such subscriber-classifying points of view are, for example specific services (Fleurop, Emergency Service), specific fields (Hotels) or specific subscriber groups (Siemens employees, residents of a city neighborhood). It is thus possible for independent vendors or operators to achieve improved reachability for such services, fields or subscriber groups.

According to another advantageous development of the invention, the first and/or second address converters are configured as devices of various sub-networks of an overlapping communication network or as independent units in the sense of intelligent networks. These address converters serve as bridges between the networks in the addressing. The expanded addressing can be economically offered when it is made accessible to the calling subscribers of a plurality of communication networks.

The second identification features advantageously contain operator-specific telephone numbers or subscriber addresses. A direct connection setup without further format conversion is thus possible with these second identification features.

The first identification features contain, for example, street addresses or vehicle identifiers of the subscriber of the second communication terminal equipment or other characteristics that can be easily remembered by a person. The structure of the first identification features should assure a fast selection of the address converters and an adequately good limitation for a search algorithm.

An advantageous configuration of the invention provides that the first or second address converter communicates the second identification features for a setup of the communication connection to the first switching node. The function of the address converters can thus be essentially limited to the translation of the addresses and, potentially, a manipulation of the data entries. The address converters can be simply and cost-beneficially realized and can be universally employed at the same time.

Advantageously, a subscriber can modify the identification features of the communication terminal equipment allocated to him. The subscriber is thus given the possibility and the responsibility of himself defining the identification features with which he can be reached or with which he usually has address conversions undertaken given an outgoing call. The rigid allocation of communication terminal equipment and operator-specific telephone number is canceled and a further latitude for configuration is established. For example, a special allocation can be defined short-term for advertising campaigns or the like.

A further advantageous configuration provides that the plurality of and/or the length of the first identification features is classified for a subscriber. A configuration latitude that is limited and can be expanded step-by-step is thus established for the subscriber; this can be connected to predetermined charges. The inventive service can thus be introduced in steps and allows a gradual adaptation to the requirements of the subscriber. When this plurality or, respectively, length is exceeded, a modification of the first identification features is disabled for the subscriber, prevention evasion of the limited latitude for design.

The inventive method allows the conversion between different address types, for example between telephone numbers and E-mail addresses.

It is also advantageous that, when the first switching node determines a format error when interpreting the first address information, a defined address converter is automatically used for interpreting the first address information. Format errors thus do not lead to an abort of the connection setup but can be handled by an address converter that is individually defined for each switching node. The switching nodes in this development need not be equipped for a selection of a suitable address converter.

An advantageous development provides that the first and/or second address converter informs the first switching node or, respectively, the first communication terminal equipment about lacking identification features. The subscriber is thus made aware of problems in the connection setup. Advantageously, the lacking identification features are communicated from the first communication terminal equipment and/or the first switching node to the first and/or second address converter. Valid identification features can be generated in the form of a dialog.

The implementation of the method is simplified when a first identification feature contains a character for a following, incomplete, first address information. Here, the first communication terminal equipment already indicates to the first switching node that an address conversion is necessary. This measure replaces the detection of format errors in the switching nodes.

An advantageous application of the method is a mobile radio telephone network, in which parts of the second identification features describe the address of a home register and of the second communication terminal equipment. In addition to the identification of the second communication terminal equipment, the fast localization thereof and an accelerated connection setup are also supported.

BRIEF DESCRIPTION OF THE DRAWINGS

The invention is explained in greater detail below with reference to exemplary embodiments on the basis of graphic illustrations.

DESCRIPTION OF THE PREFERRED EMBODIMENTS

Figure 1:
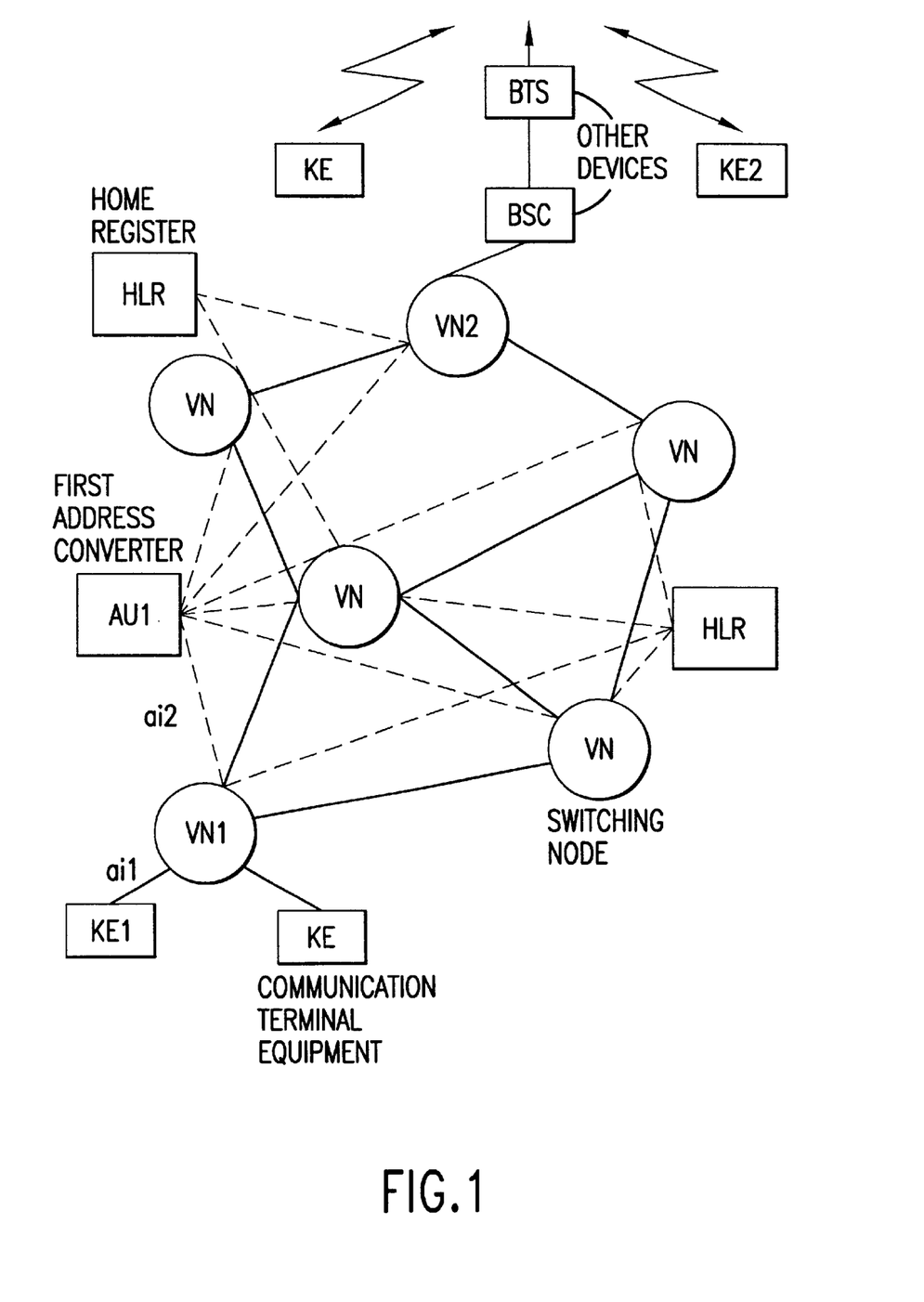
FIG. 1 is a block diagram showing a schematic view of a communication network with an address converter.

FIG. 1 shows a communication network with switching nodes VN, VN1, VN2. The switching nodes VN, VN1, VN2 are digital switching centers (for example, EWSD of Siemens AG), mobile switching centers (MSC) or packet network nodes. Potentially via other devices BSC, BTS, they produce the connection of communication terminal equipment KE, KE1, KE2 to the communication network. The communication terminal equipment KE, KE1, KE2 are allocated to subscribers or subscriber groups, such as individuals or families, organizations, companies, etc.

The switching nodes VN, VN1, VN2 are connected to one another, so that communication connections between the communication terminal equipment KE, KE1, KE2 can be setup, operated and in turn, clear down via one or more switching nodes VN, VN1, VN2. The communication terminal KE, KE1, KE2 can be fixed network terminals over mobile terminal equipment. The information to be transmitted can be voice information or digital data. Voice information shall be assumed below, so that a voice connection to the subscriber of the communication terminal equipment KE2 is set up for a subscriber with the communication terminal equipment KE1.

The switching nodes VN, VN1, VN2 serve for switching and through-connection of the communication connections proceeding from address information ai1, ai2 that identify the called subscriber with the communication terminal equipment KE2. Furthermore, the communication network comprises what are referred to as home registers HLR that serve for the storing and administration of subscriber information for mobile communication terminal equipment KE, KE2. A first address converter AU1 likewise belongs to the communication network. The first address converter AU1 and the home register HLR are connectible to the switching nodes VN, VN1, VN2 via signaling connections as illustrated by the broken line in FIG. 1.

Figure 2:
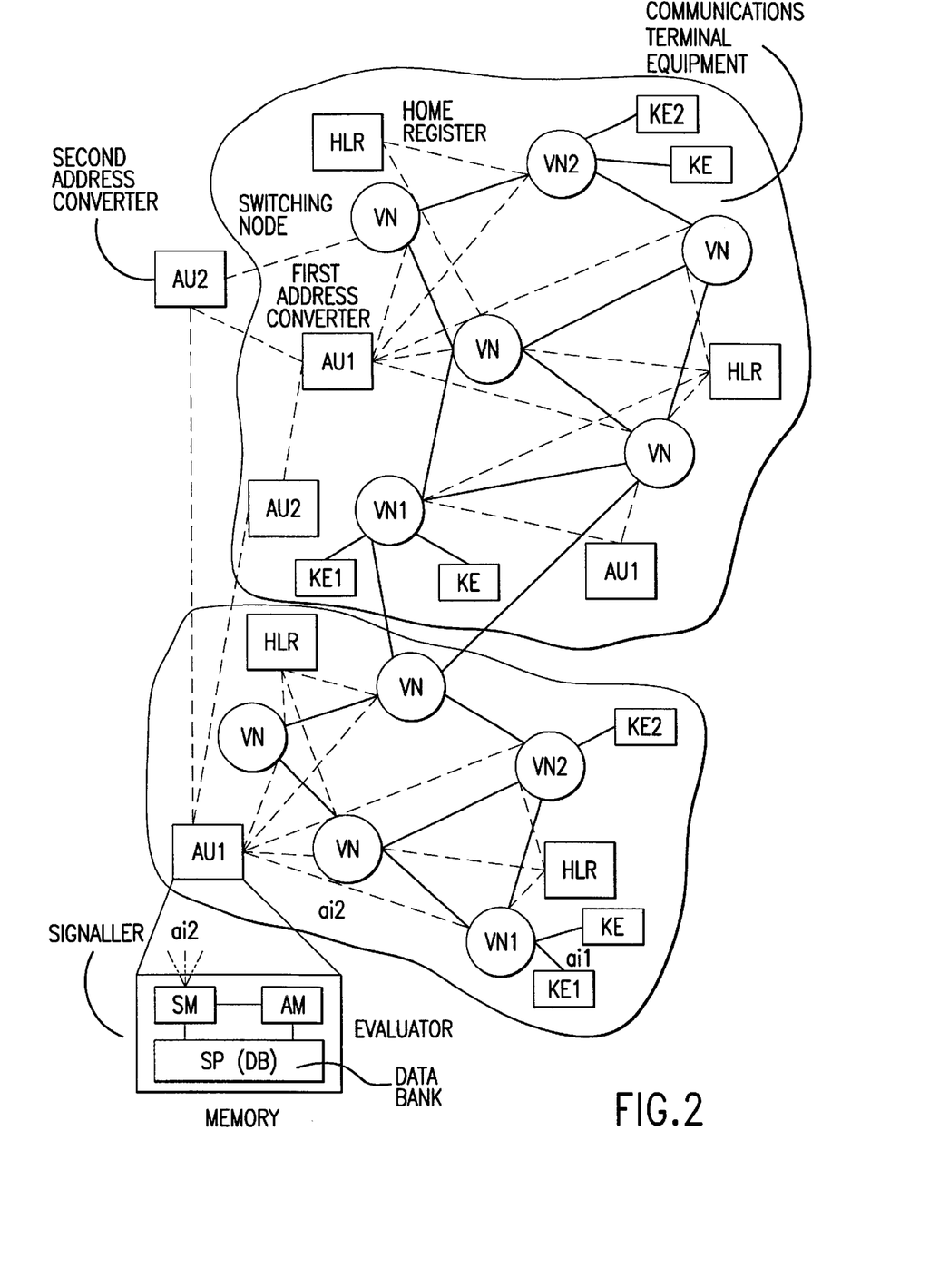
FIG. 2 is a block diagram showing a schematic view of two communication networks with first and second address converters.

FIG. 2 shows an expanded scenario with two communication networks. Added to the communication network already described with FIG. 1 (shown in the top portion of FIG. 2) that, for example, is a mobile radio telephone network in Germany, is a second communication network, for, a fixed network in France, and a second address converter AU2. Respective first address converters AU1 have a fixed reference to specific switching nodes VN, VN1, VN2 in both communication networks; a first address converter AU1 assumes the address conversion function in the first communication network for a defined part of the network.

The first address converter AU1 is thereby interrogated by the switching node VN1 with a signaling message that contains a first address information ai1 in case the respective switching node VN1 recognizes a format error in the first address information ai1 for a connection setup.

Beyond the regional allocation of first address converters AU1 to specific switching nodes VN, VN1, VN2 or, respectively, to parts of the communication network, FIG. 2 also shows second address converters AU2. A second address converter AU2 is part of the first communication network and a further, second address converter AU2 is operated by a separate vendor outside the communication networks. The second address converters AU2 can also be connected to the first address converters AU1 or to switching nodes VN via signaling connections.

Differing from the first address converters AU1, the second address converters AU2 are not regionally allocated but realize address conversion functions that are allocated to individual, special areas. Thus, the second address converter AU2 of the first communication network assumes functions of address conversions for hotels in both countries, and the external second address converter AU2 is responsible for the address conversion for European Fleurop services.

The structure of an address converter is illustrated by way of example with reference to the first address converter AU1. The address converter contains signaller SM for receiving address information ai2 from the switching nodes VN, VN1, VN2, memory SP for storing a data bank DB with allocations of first im11, im12 to second im21, im22 identification features, and evaluator AM for deriving second identification features im21, im22 from the first identification features im11, im12 with the assistance of the data bank DB. The signaller SM communicates the second identification features im21, im22 back to the switching nodes VN, VN1, VN2.

The first identification features im11, im12 are information that are inadequate for setting up the desired communication connection and must therefore be converted into the second identification features im21, im22. The second identification features im21, im22 already form an adequate address information that is interpreted by a switching node VN, VN1, VN2 for connection setup or contain information parts for such an adequate address information.

The first identification features im11, im12 are, for example, the name and the address of the called subscriber, special particulars about his biography, professional training or his vehicle identifier. Further, it can be a species term, such as a hotel, a category such as Price Group II, or a particular location, such as Leipzig City Center. The second identification features im21, im22, by contrast, might be an operator-specific telephone number for a telephone set, a facsimile device or an e-mail address with which a connection setup is possible.

A further version for an address conversion might be implemented by having a first identification feature im12 that contains the request for a conversion into an e-mail address, and a further first identification feature im 11 that contains a telephone number. A first identification feature im11 can also indicate the incompleteness of the first address information ai1; this can ensue by an input in the calling communication terminal equipment KE1, so that the switching node VN1 is directly signaled about the format error. A first identification feature im11 can also specify a specific address converter AU1, AU2 at which the calling subscriber suspects the correct address conversion or where he knows the conversion allocations appertaining to him are stored.

The entries of the data bank DB can be modified by an administrator of the network operator, a vendor, or by the subscriber. A specific length of entries provided with corresponding charges is prescribed for the subscriber, from within which he can select the entries valid for him as calling or called subscriber via a signaling dialog. Entries proceeding beyond this length are rejected.

FIGS. 3 through 7 show executive sequences for the setup of a communication connection with address conversion. A first communication terminal equipment KE1 is connected to a first switching node VN1, and a second communication terminal equipment KE2 is connected to a second switching node VN2. The connection between the switching nodes VN1, VN2 is effected via further devices of the communication—for example, further switching nodes VN. The first communication terminal equipment KE1 is allocated to the calling subscriber and the second communication terminal equipment KE2 is allocated to the called subscriber.

Figure 3:
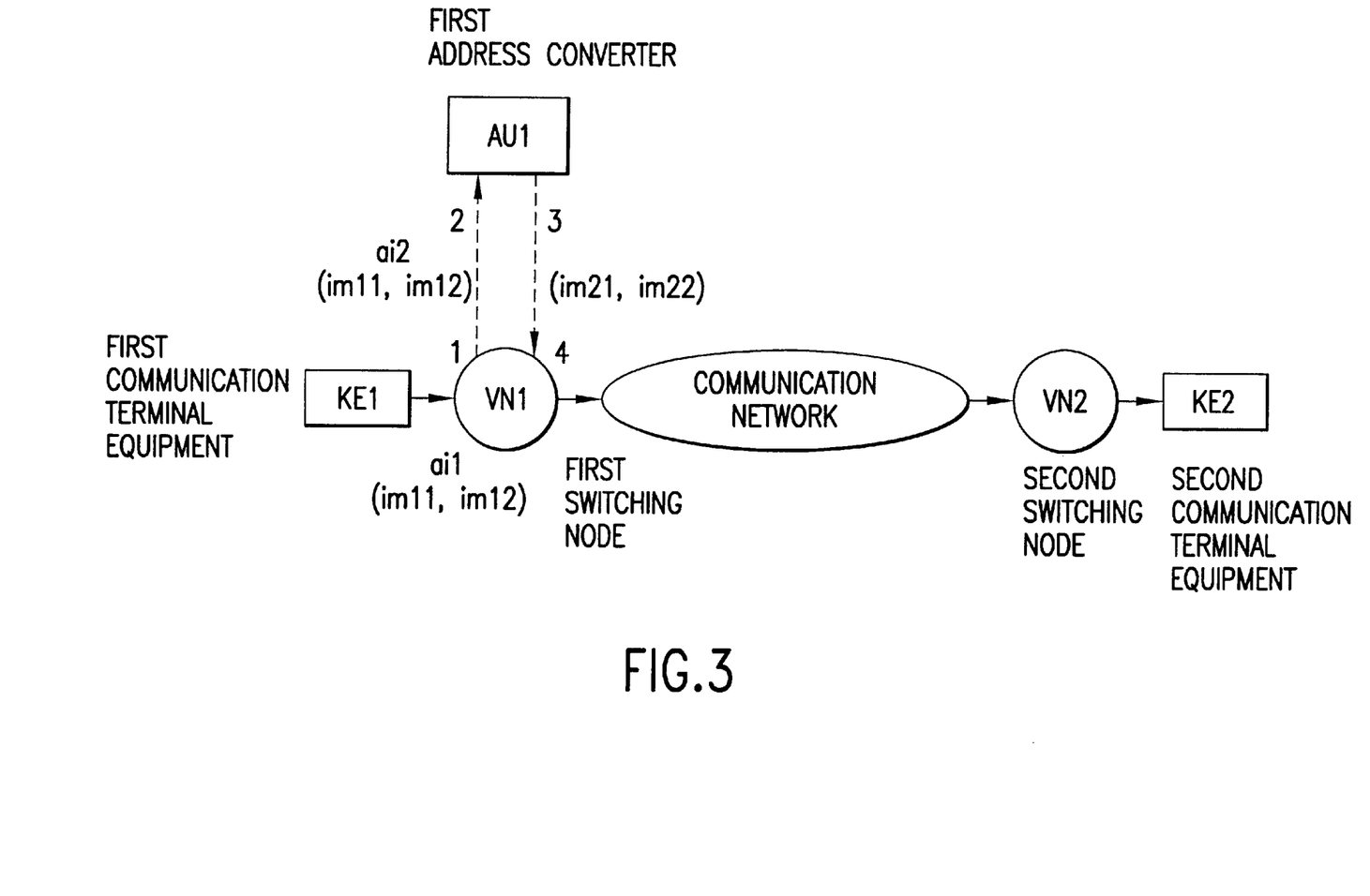
FIG. 3 is a block diagram showing a connection setup to a fixed network subscriber with address conversion in a first address converter.

In FIG. 3, the first switching node VN1 is reached by a call 1 incoming from the first communication terminal equipment KE1 to set up a communication connection. A first address information ai1 is communicated in this incoming call 1, whereby first identification features im11, im12 are contained in the first address information ai1.

The first address information ai1 is interpreted in the first switching node VN1 and a second address information ai2 for addressing a first address converter AU1 is derived from it. At least parts of the first identification features im11, im12 are communicated to the first address converter AU1 with an inquiry 2. The first identification features im11, im12 are interpreted in the address converter AU1 and are allocated to second identification features im21, im22 via the data bank DB. The second identification features im21, im22 are communicated from the first address converter AU1 to the first switching node VN1 with a reply 3 to the inquiry 2.

The second identification features im21, im22 serve, in the first switching node VN1, for addressing the second switching node VN2. The first switching node VN1 communicates the outgoing call 4 to the second switching node VN2 and to the second communication terminal KE2 via the communication network.

Figure 4:
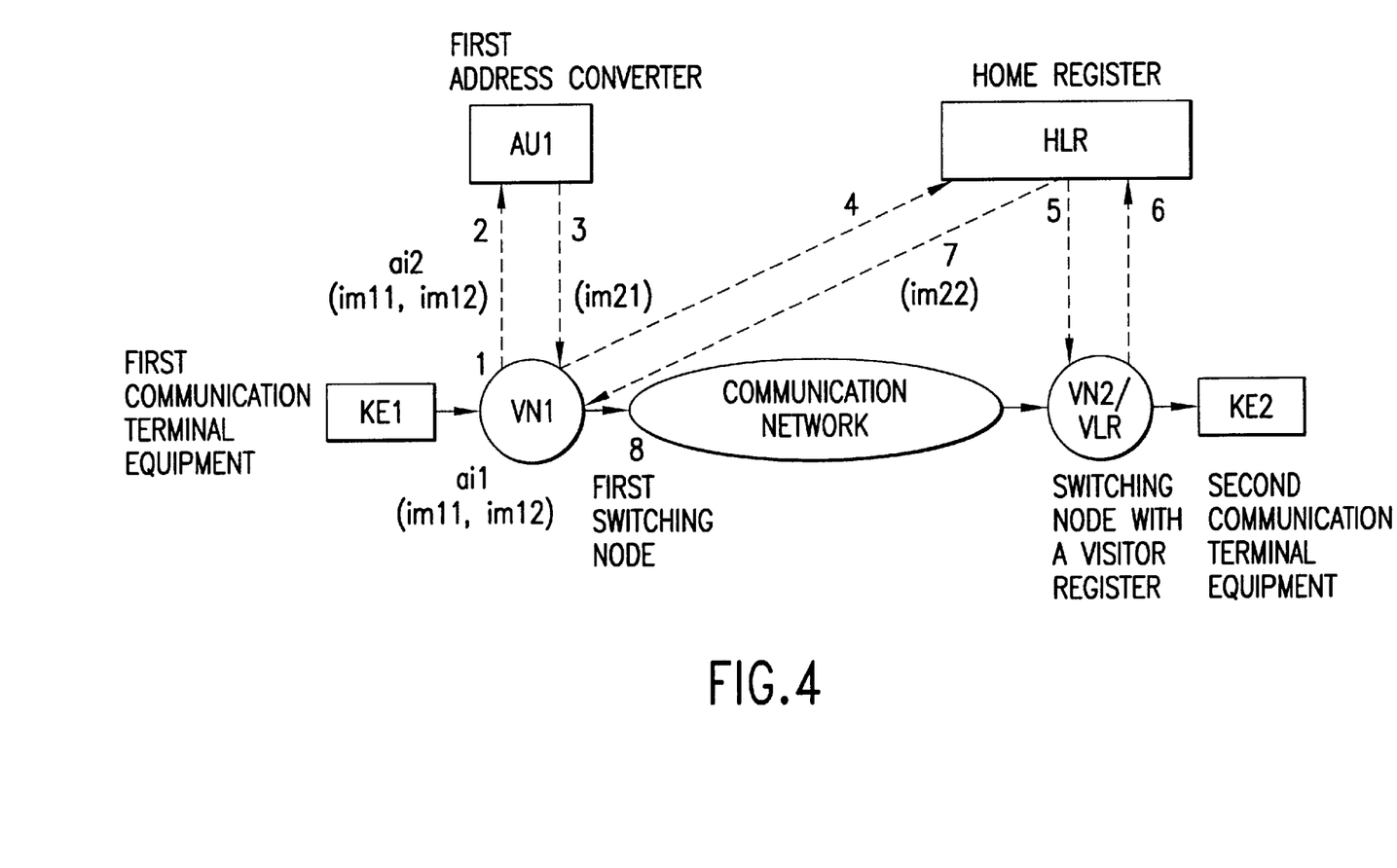
FIG. 4 is a block diagram showing a connection setup to a mobile radio telephone subscriber with address conversion in a first address converter.

The connection setup to a mobile radio telephone subscriber is shown in FIG. 4. Differing from the connection setup according to FIG. 3, an address of a home register HLR of the called mobile radio telephone subscriber is additionally communicated in response to the address conversion request 2 with the second identification features im21, im22 in the reply 3. In response to the reply, the first switching node VN1 sends the home register HLR a message 4 (SendRoutingInfo) for determining the location of the mobile radio telephone subscriber.

The home register HLR interprets the current subscriber entries and identifies the switching node VN2 with a visitor register VLR at which the called mobile radio telephone subscriber is then registered. An inquiry 5 (ProvideRoamingNumber) to the visitor register VLR interrogates a currently valid visitor number (MsISDN). This visitor number is communicated to the home register HLR in a reply 6 (ProvideRoamingNumberResult), after which a current routing information is sent to the first switching node VN1 with a reply 7 (SendRoutingInfoResult).

The connection setup 8 to the second communication terminal KE2 ensues with this routing information and the second identification features im21, im22.

Figure 5:
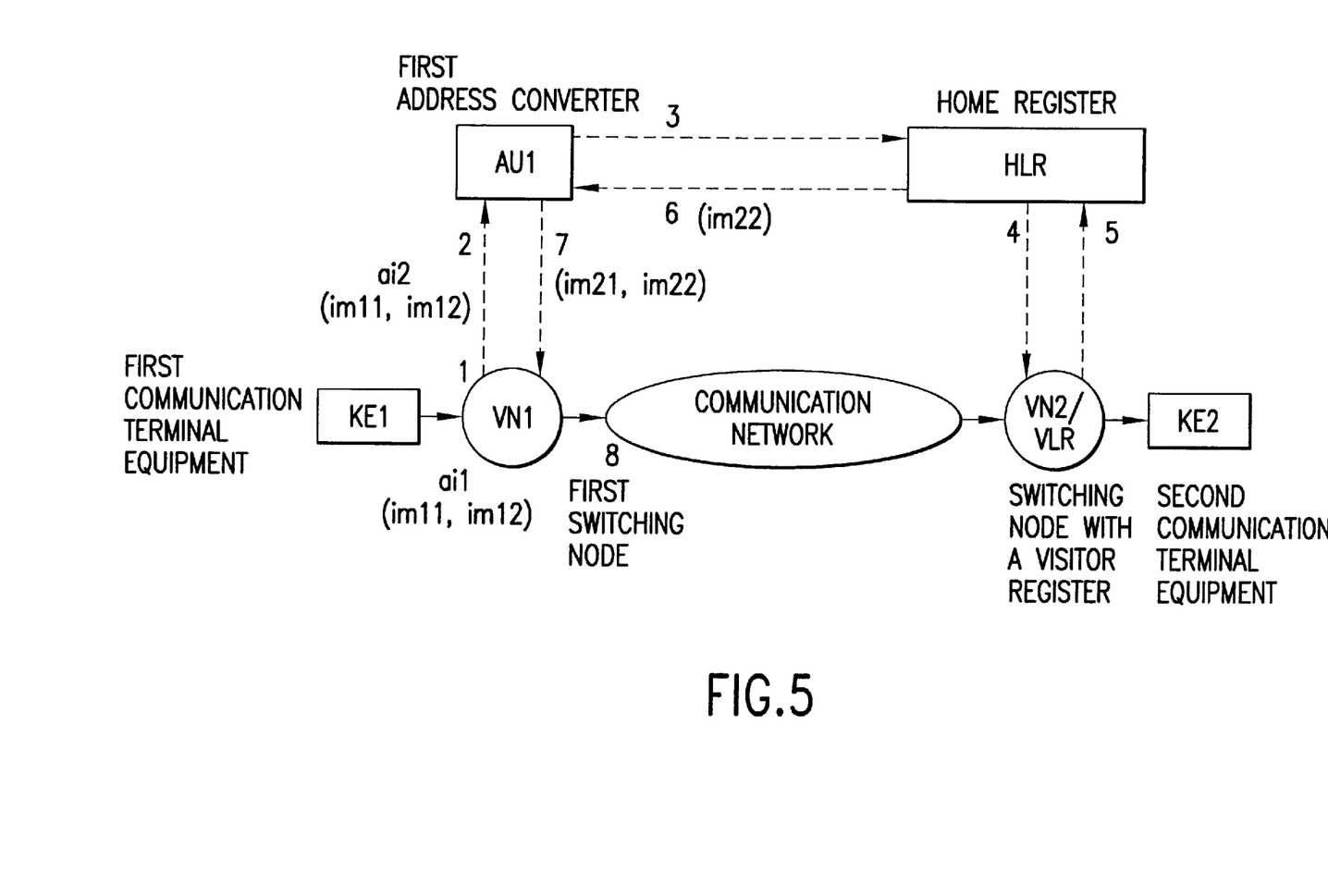
FIG. 5 is a block diagram showing a connection setup to a mobile radio telephone subscriber with address conversion and home register interrogation in a first address converter.

In the connection setup according to FIG. 5, the first address converter AU1 initiates the interrogation 3–6 itself at the home register HLR and visitor register VLR of FIG. 4. To accomplish this, the first address converter AU1 must be expanded by the interworking functions of this inquiry. The first switching node VN1 receives the second identification features im21, im22 and the routing information for the called mobile radio telephone subscriber with the second communication terminal equipment KE2 from the first address convertor AU1 in response to receipt of the information with a message 7.

Figure 6:
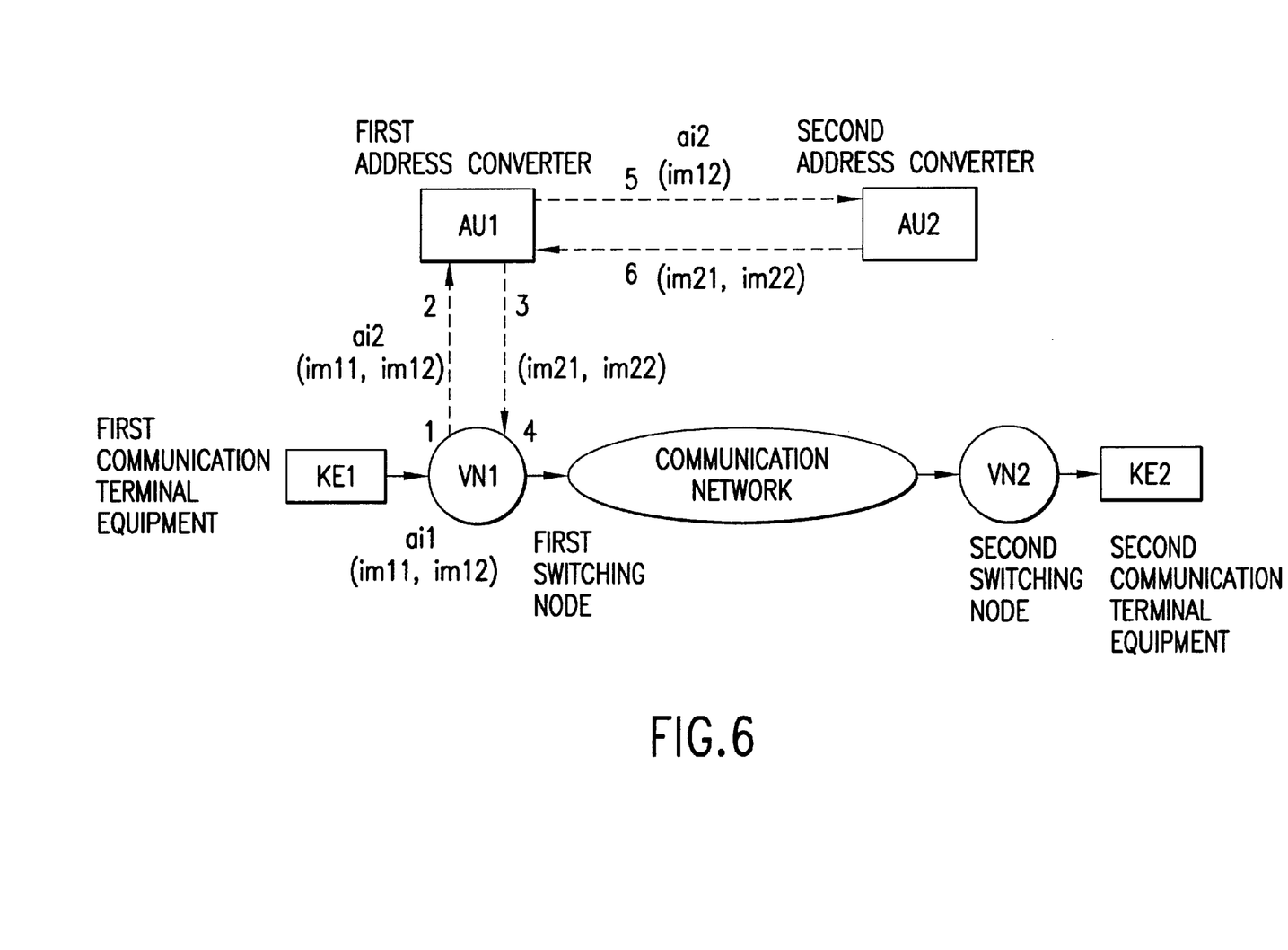
FIG. 6 is a block diagram showing a connection setup to a fixed network subscriber with address conversion in a first address converter and a second address converter.

FIG. 6 shows the switching setup similar to FIG. 3, but with a first address converter AU1 and a second address converter AU2. In response to the inquiry 2 for address conversions, the first address converter AU1 recognizes that the second address converter AU2 is intended for the required or requested conversion and initiates an inquiry 5 to the second address converter AU2. The second address AU2 determines the second identification features im21, im22 and communicates them to the first address converter AU1, which, as already shown, forwards these second identification features im21, im22 to the first switching node VN1.

Figure 7:
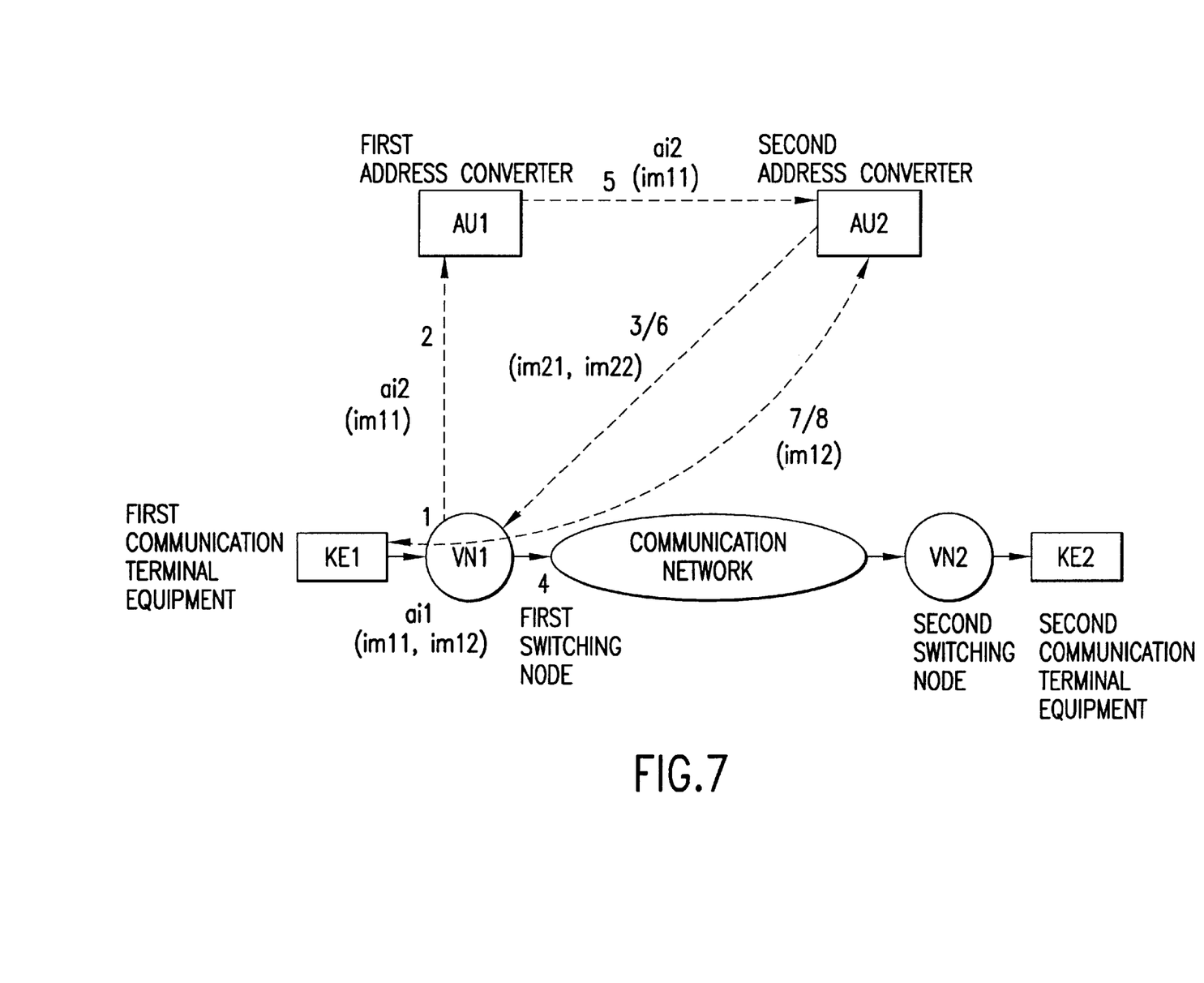
FIG. 7 is a block diagram showing a connection setup to a fixed network subscriber with address conversion in a first and second address converter as well as with subscriber dialog.

FIG. 7 shows the case where an address converter, for example, the second address converter AU2, finds that the first identification features im11, im12 are inadequate for an address conversion. With a dialog 7, 8 with the first communication terminal equipment KE1, the lacking particulars are added or incorrect particulars are corrected, whereupon the first switching node VN1 receives the secondary identification features im21, im22 for connection setup sent to it from the second address converter AU2.

The inquiries to the address converters AU1, AU2 are signaling connections. The same is true of the dialog between the first communication terminal equipment KE1 and the address converters AU1, AU2.

We claim:

1. A method for setting up a communication connection in a communication network having a plurality of interworked switching nodes comprising a first switching node and a second switching node, wherein communication terminal equipment, comprising a first communication terminal equipment, and a second communication terminal equipment, are connected via said switching nodes, said method having identification features comprising first identification features, and second identification features, said method utilizing symbol converters, comprising a first symbol converter and a second symbol converter, said method comprising:

transmitting a first address information from a first communication terminal equipment to said first switching node for setting up a communication connection, wherein first identification features are included in said first address information;

interpreting, by said first switching node, said first address information with said first identification features;

deriving a second address information for addressing a first symbol converter by said first switching node from said first address information;

communicating at least parts of said first identification features, by said first switching node, to said first symbol converter;

translating symbols of said first identification features into symbols of second identification features, by said first symbol converter, that address said second switching node; and setting up the communication connection between said first and said second switching node with said second identification feature.

2. A method according to claim 1, further comprising the steps of:

identifying, by said first symbol converter, an address of an appertaining, second symbol converter for identification features from said first identification features; and generating, by said second symbol converter, said second identification features by the transmission of at least parts of said first identification features following corresponding signaling.

3. A method according to claim 1, further comprising the step of:

arranging a plurality of first symbol converters in said communication network according to geographical points of view.

4. A method according to claim 1, further comprising the step of:

arranging a plurality of second symbol converters in said communication network according to subscriber-classifying points of view.

5. A method according to claim 1, further comprising the step of:

configuring one of said symbol converters as a device of a different communication network.

6. A method according to claim 1, wherein said second identification features contain information selected from the group consisting of an operator-specific telephone numbers and subscriber addresses.

7. A method according to claim 1, wherein said first identification features contain information selected from the group consisting of a name, a street address, and a vehicle identifier of a subscriber of said second communication terminal equipment.

8. A method according to claim 1, further comprising the step of:

communicating, by one of said symbol converters, said second identification features to said first switching node for said setup of said communication connection.

9. A method according to claim 1, further comprising the step of:
   modification, by a subscriber, said identification features of said communication terminal equipment allocated to said subscriber.

10. A method according to claim 1, further comprising the steps of:
   classifying an attribute boundary selected from the group consisting of a plurality of said first identification features and a length of said first identification features, for a subscriber; and
   inhibiting modification of said identification features when said attribute boundaries are exceeded.

11. A method according to claim 1, wherein:
   said first identification features correspond to a first address type, and said second identification features correspond to a second address type.

12. A method according to claim 1, wherein said step of interpreting, by said first switching node, said first address information, further comprises the steps of:
   identifying a format error when interpreting said first address information; and
   automatically using a defined symbol converter for interpreting said address information.

13. A method according to claim 1, further comprising the step of:
   informing, by one of said symbol converters, a device selected from the group consisting of said first switching node and said first communication terminal equipment about lacking identification features.

14. A method according to claim 13, further comprising the step of:
   communicating said lacking identification feature of incomplete address information from a device selected from the group consisting of said first communication terminal equipment and said first switching node to one of said symbol converters.

15. A method according to claim 1, wherein
   a first identification feature contains a character for an incomplete first address information.

16. A method according to claim 1, further comprising the steps of:
   configuring said communication network as a mobile radio telephone network; and
   describing, by parts of said second identification features, an address of a home register of said second communication terminal equipment.

17. A symbol converter for a communication network, comprising:
   a plurality of interworked switching nodes, communication terminal equipment connected via said switching nodes, for supporting the setup of a communication connection from a first communication terminal equipment to a second communication terminal equipment;
   a signaller for receiving a second address information from a first switching node wherein first identification features are included in said second address information;
   memory for the allocation of first identification features to second identification features; and
   an evaluator for translating symbols of said first identification features into symbols of said second identification features with the assistance of said data bank.

18. A symbol converter according to claim 17, wherein:
   said signaller is fashioned such that parts of said second identification features are derived via a dialog with said first communication terminal equipment.

19. A symbol converter according to claim 17, that is part of a switching node.

* * * * *